(12) United States Patent
Dörr et al.

(10) Patent No.: US 9,359,586 B2
(45) Date of Patent: Jun. 7, 2016

(54) MANUFACTURE OF BEER

(75) Inventors: Tillmann Dörr, Hohen-Sülzen (DE); Lutz Guderjahn, Offstein (DE); Jörg Kowalczyk, Eisenberg/Steinborn (DE); Roland Pahl, Berlin (DE); Jan Schneider, Schwelentrup (DE)

(73) Assignee: SÜDZUCKER AKTIENGESELLSCHAFT, Mannheim/Ochsenfurt (DE)

( * ) Notice: Subject to any disclaimer, the term of this patent is extended or adjusted under 35 U.S.C. 154(b) by 172 days.

(21) Appl. No.: 12/091,431

(22) PCT Filed: May 17, 2006

(86) PCT No.: PCT/EP2006/004683
§ 371 (c)(1),
(2), (4) Date: Apr. 24, 2008

(87) PCT Pub. No.: WO2007/048450
PCT Pub. Date: May 3, 2007

(65) Prior Publication Data
US 2008/0248158 A1  Oct. 9, 2008

(30) Foreign Application Priority Data

Oct. 26, 2005  (DE) .......................... 10 2005 052 210

(51) Int. Cl.
*C12C 11/00* (2006.01)
*C12C 5/00* (2006.01)
*C12G 3/04* (2006.01)

(52) U.S. Cl.
CPC ................. *C12C 11/003* (2013.01); *C12C 5/00* (2013.01); *C12G 3/04* (2013.01); *A23V 2002/00* (2013.01)

(58) Field of Classification Search
CPC ........... C12C 5/00; C12C 11/003; C12G 3/04
USPC ............................................ 426/16, 592, 13
See application file for complete search history.

(56) References Cited

U.S. PATENT DOCUMENTS

| 4,009,286 A | * | 2/1977 | Moll et al. ...................... 426/13 |
| 4,659,662 A | | 4/1987 | Hsu |
| 5,786,140 A | | 7/1998 | Mattes et al. |
| 2005/0019447 A1 | | 1/2005 | Rehmanji et al. |
| 2008/0220121 A1 | | 9/2008 | Dorr et al. |

FOREIGN PATENT DOCUMENTS

| CN | 1 049 028 A | | 2/1991 |
| DE | 1 642 698 | | 7/1970 |
| DE | 23 44 252 | | 3/1975 |
| DE | 2344252 | * | 3/1975 |
| DE | 27 29 961 | | 6/1978 |
| DE | 44 14 185 C1 | | 9/1995 |
| DE | 103 61 313 | | 7/2005 |
| EP | 0630252 | * | 6/1987 |
| GB | 1179482 | | 1/1970 |
| JP | 09094085 | | 4/1997 |
| KR | 10-2005-0082667 | | 8/2005 |
| WO | WO 2005/061690 | | 7/2005 |

OTHER PUBLICATIONS

G.A. Ermolaeva et al., "Technology and equipment for beer and non-alcoholic beverages production", Text book Ministry of Education of the Russian Federation, Institute of Professional Education Development, Academa, Moscow, IRPO 2000, pp. 241-243.
English translation of the relevant parts of Russian Office Action dated Sep. 15, 2009 relating to Russian Patent Application No. 2008120638/13.
International Search Report dated Aug. 22, 2006 issued in corresponding PCT Application No. PCT/EP2006/004683.
Database WPI, Section CH Week 199142, Derwent Publications Ltd. London, GB; Class D16, AN 1991-303526, XP002393030 & CN 1 049 028 A, dated Feb. 6, 1991.
Notice of Preliminary Rejection dated Feb. 1, 2012 in corresponding Korean Patent Application No. 10-2008-7011724 (with English summary in form of letter dated Feb. 24, 2012 from Korean attorney).

\* cited by examiner

*Primary Examiner* — Vera Stulii
(74) *Attorney, Agent, or Firm* — Ostrolenk Faber LLP

(57) ABSTRACT

The present invention relates to agents and processes for the improved production of beer and mixed beer beverages, wherein the main fermentation is shortened and the formation of vicinal diketones is reduced.

6 Claims, 4 Drawing Sheets

MANUFACTURE OF BEER

CROSS REFERENCE TO RELATED APPLICATIONS

The present application is a 35 U.S.C. §§371 national phase conversion of PCT/EP2006/004683, filed May 17, 2006, which claims priority of German Patent Application No. 10 2005 052 210.6, filed Oct. 26, 2005, the disclosure of which has been incorporated herein by reference. The PCT International Application was published in the German language.

TECHNICAL FIELD

The present invention relates to agents and processes for the improved production of beer and mixed beer beverages.

BACKGROUND OF THE INVENTION

Diacetyl (2,3-butanedione) and other vicinal diketones and precursors thereof are formed as so-called secondary fermentation products from the yeast during fermentation. Diacetyl is considered to be one of the young bouquet substances which determine the aroma of beer at the unfinished stage. Diacetyl is known in the food industry as synthetic butter aroma. When the flavour threshold value of approximately 0.1 mg/l (0.1 ppm) is exceeded, it provides beer with an impure, sweetish taste (off-flavour) which, when present in relatively high concentration, gives rise to the butter aroma which is usually undesirable in beer.

During fermentation, the yeast used forms pyruvate as one of the main products of the energy metabolism. During this process, acetohydroxy acids are also formed which are released by the yeast to the surrounding medium. Outside of the yeast cells, the vicinal diketones pentanedione and diacetyl are formed from these acetohydroxy acids by oxidative decarboxylation. This process occurs spontaneously without the participation of the yeast.

Diacetyl is an intermediate product in fermentation. The decomposition of diacetyl takes place by yeast which absorbs the diacetyl and uses it as hydrogen acceptor. The diacetyl is reduced by the yeast, via the intermediate stage of acetoin, to form butanediol, a substance which, as a result of its very high flavour threshold value, no longer influences the beer aroma.

The fermentation process for the production of beer usually takes places in two stages: the main fermentation is triggered by the addition of microorganisms, in particular yeasts. During this process, the fermentation substrate, the so-called extract, is essentially subjected to alcoholic fermentation. The main fermentation process usually takes place under warm conditions (at approximately 15 to 22° C.) or with cooling (approximately 5 to 10° C.). The main fermentation process as such is completed when the extract obtained has been completely attenuated. This moment is referred to as the end point of extract fermentation. For the decomposition of the undesirable secondary fermentation products, vicinal diketones, the main fermentation process needs to be maintained after reaching the end point until the total diacetyl content has fallen below the flavour threshold value (threshold of perception). Once the threshold value has been reached, the main fermentation process is terminated, the green beer obtained is cooled down and subjected to a week long secondary fermentation in the cold (at approximately 0 to −1° C.), whereby the beer is clarified. The process of secondary fermentation is also referred to as maturation.

The guide value for the total diacetyl content (vicinal diketones and precursors) for a fully matured beer is as a rule 0.1 mg/l. Consequently, this value is frequently used in breweries as the determining parameter in order to determine the end point of main fermentation. As a rule, this additional period following the end point of extract fermentation is 1 to 4 days.

A disadvantage of known production processes for beer or mixed beer beverages is that the main fermentation process frequently needs to be carried out for longer than is necessary to attenuate the extract. In view of the fact that main fermentation is frequently carried out at a temperature that is elevated (at approximately 15 to 22° C.) or reduced (at approximately 5 to 10° C.) by technical means, the longer main fermentation process is associated with a higher consumption of energy. Moreover, the fermenting tub is blocked for a new fermentation batch for longer. Mostly however, it is precisely the availability of the fermentation tubs which is the limiting factor regarding the capacity of a brewery. It would be desirable to complete the main fermentation process earlier at a point in time at which the extract has been completely or largely attenuated. In order to obtain a beer acceptable from the point of view of flavour, however, the proportion of by-products detrimental to the flavour, such as the total diacetyl content, would have to have fallen to below the threshold of perception. Consequently, there is a requirement for an improved production process for beer or mixed beer beverages in which, above all, the main fermentation process is shortened.

SUMMARY OF THE INVENTION

The technical problem on which the present invention is based consists essentially of the provision of agents and processes for the improved production of beer or mixed beer beverages, in which the fermentation curve, particularly the main fermentation process, is shortened and beer or mixed beer beverages above reproach from the flavour point of view are obtained.

The basic problem is solved by the use of isomaltulose or isomaltulose-containing compositions in a species-appropriate process for the production of beer of mixed beer beverages wherein, in a first step, (a) a wort is prepared from brewing liquor, if necessary hops and at least one source of carbohydrate and, in a subsequent step (b) the wort is microbially attenuated, step (b) comprising the sub-steps (b1): main fermentation and (b2): secondary fermentation/maturation. The process according to the invention is characterised in that an isomaltulose or an isomaltulose-containing mixture is contained in the wort as the at least one source of carbohydrates and in step (c1) the main fermentation is completed as soon as the attenuable portion of extract in the wort has been completely or largely attenuated. The end point of extract fermentation is recognisable in particular by the portion of extract not decreasing any further during the further course of fermentation (extract curve). Preferably, 70% or more, in particular at least 75%, of the extract has been attenuated by that point in time. It will be appreciated that the final fermentation depends on the yeast used.

DETAILED DESCRIPTION OF CERTAIN EMBODIMENTS OF THE INVENTION

Preferably, malted grain (malt) and/or unmalted grain and/or raw grain are used as the main component of the carbohydrate compound for the preparation of the wort. Preferably 10 to 15 g/100 ml of malt and/or ummalted grain or raw grain is used. Alternatively, the proportion of isomaltulose in the wort can also be determined via the ratio to the main component of the carbohydrate compound, in particular malt; preferably, the ratio of isomaltulose to the further carbohydrate components is approximately 1:20 to approximately 1:5, preferably approximately 1:16 to approximately 1:8. Preferably, isomaltulose is added to a conventional wort.

By way of the addition of isomaltulose or at least replacement of part of the carbohydrate component by isomaltulose in a conventional beer wort in generic beer production processes, the invention also provides for the main fermentation to be terminated as early as on reaching the end point of extract fermentation. Surprisingly it has been found that, as early as at that point in time, the proportion of vicinal diketones has fallen to below the taste threshold value of approximately 0.1 mg/l (0.1 ppm). Surprisingly, it is possible by using isomaltulose as a carbohydrate component of a wort to achieve, that as early as after a short main fermentation, a green beer unimpaired from the flavour point of view by secondary fermentation products can be obtained which can be subjected much earlier to a species-appropriate subsequent secondary fermentation or maturation. As a result, the entire brewing process is usually shortened by several days, allowing considerable savings in time and costs and an increase in brewing capacity.

In detail, it has surprisingly been found that the addition of a small quantity of isomaltulose, leads to a markedly reduced formation of vicinal diketones, in particular measured via the diacetyl content, during main fermentation. This advantageous effect is found when using current brewer's yeasts. The effect is independent of the malt used. On average, approximately 30% less diacetyl is formed in isomaltulose-containing worts according to the invention then in the same worts without isomaltulose (comparative worts). It has been found that both the maximum value of the quantity of diacetyl formed and the quantity of diacetyl on the last day, according to the invention, of fermentation (end point of extract fermentation) was considerably higher in a conventional wort without isomaltulose (comparative wort) than in a wort with a proportion of isomaltulose according to the invention.

Moreover, it has surprisingly been found that the reduction of the formation of diacetyl in the presence of isomaltulose is lower when the isomaltulose content of the wort is above a certain limit value. The diacetyl formation is reduced with an isomaltulose content above approximately 2 g/100 ml in the wort only to such a small extent that the technical problem on which the invention is based can no longer be appropriately solved in many cases.

Isomaltulose (6-O-α-D-glucopyranosyl fructose), known by the name of Palatinose™, is a disaccharide ketose which occurs naturally e.g. in honey. According to DE 44 14 185 C1, isomaltulose can be produced by enzymatic rearrangement, using immobilised bacteria cells, for example, in particular *Protaminobacter rubrum, Erwinia rhapontici* and *Serratia plymuthica* or a sucrose isomerase isolated therefrom, from sucrose on an industrial scale.

An "isomaltulose-containing mixture" is a combination of isomaltulose with at least one further carbohydrate, in particular fructose, glucose, sucrose, trehalulose, leucrose, turanose, tagatose, isomaltose, isomelizitose, oligosaccharides with a degree of polymerisation of 3 or 4 or more or mixtures thereof. In a modification, the mixture contains isomaltulose and fructose, in a further modification, the mixture contains isomaltulose and glucose, in a further modification the mixture contains isomaltulose and sucrose, in a further modification the mixture contains isomaltulose and trehalulose, in a further modification the mixture contains isomaltulose and leucrose, in a further modification the mixture contains isomaltulose and tagatose in a further modification the mixture contains isomaltulose and isomaltose, in a further modification the mixture contains isomaltulose and turanose, in a further modification the mixture contains isomaltulose and isomelizitose, in a further modification the mixture contains isomaltulose and oligosaccharides with a degree of polymerisation of 3 or 4 or more. In a preferred embodiment, the isomaltulose-containing mixture is the sucrose-isomerisation product which has been obtained by transglucosidation of sucrose, preferably using dead or living cells of *Protaminobacter rubrum* or enzyme extracts produced therefrom. Isomaltulose-containing mixtures used according to the invention contain, in a particularly preferred embodiment of the invention, approximately 79-85% isomaltulose, 8-10% trehalulose, 0.5-2% sucrose, 1-1.5% isomaltose, oligosaccharide, 2.5-3.5% fructose and 2.0-2.5% glucose or they consist thereof, these details relating to the total weight of dry matter.

"Wort" should be understood to mean the extract-containing aqueous solution liberated from insoluble components (spent grains, sediment particles) which consists of a carbohydrate source, e.g. malt, to which water has preferably been added and which has been boiled. After boiling with hops, the so-called finished wort is obtained. After cooling, the boiled wort is available as pitching wort. Preferably, the wort is produced by mashing, lautering, wort boiling and wort treatment. The production of the wort has the particular aim of converting initially undissolved and unattenuable components of the source of carbohydrate, in particular malt, into soluble attenuable substances, separating off the remaining solid components and, if necessary, finally adding seasoning, i.e. the hop extract.

During mashing, the milled source of carbohydrate in particular malt, is preferably first mixed with the brewing liquor. Subsequently, preferably in the so-called mashing processes, a targeted enzymatic conversion of constituents of the source of carbohydrate takes place in a specific temperature-time programme, the most important process being the complete decomposition of starch to attenuable sugars such as glucose, maltose or maltotriose and non-attenuable dextrins. The temperature optimum of maltose formation is 60° C.-65° C., that of dextrin formation 70° C.-75° C. The temperature determines the final fermentation of the wort depending on the type of beer. Following lautering and sweetening out of the spent grains with hot brewing liquor (78° C.), the wort is preferably boiled for 60 min to 100 min, preferably with the addition of hops, preferably approximately 150 to 500 g/hl of hops being added, depending on the type of beer to be produced. By evaporating preferably approximately 6-10% of the feed quantity, the content of original wort is adjusted. During boiling, sterilisation additionally occurs, a coagulation of proteins takes place, bitter substances of the hops are isomerised and aroma compounds are formed and partially evaporated. The boiled and hopped wort is subsequently preferably liberated from sediment particles in the whirlpool and/or by filtration. After cooling of the wort which usually takes place in plate heat exchangers, the cold break is preferably partially removed and an intensive aeration takes place to supply the microorganisms used for fermentation with oxygen. Immediately subsequently, at least one suitable, fermentation-intensive microorganism, conventionally brewer's yeast is added to the wort (pitching). Since the wort used for fermentation may contain different sources of carbohydrate, pale or dark microbiologically stabilised beers can be produced by using the process according to the invention.

According to the invention, part of the extract of the wort is preferably replaced by isomaltulose. Thus, the proportion of metabolisable carbohydrates in the wort is, if necessary, reduced such that, preferably, the alcohol content of the beverage produced is, moreover, reduced compared with that of a normal beer. The alcohol content of the beers produced according to the invention can, if necessary, be further reduced by using alcohol removal processes. An "alcohol-free beer" should be understood to mean a beer with an alcohol content of less than 0.5% by vol. which preferably contains approximately 7 to 8% by vol. of original wort. A "low-alcohol beer" should be understood to mean, according to the invention, a beer which has an alcohol content of less than 5% by vol., in particular less than 4% by vol.

A "source of carbohydrate" should be understood to mean all usable materials containing carbohydrates such as grain products in the case of which the carbohydrates can be converted at least partially during the production of the wort into attenuable soluble sugar such as glucose, maltose or maltotriose (saccharification) which are then utilised as source of carbohydrates by microorganisms, in particular the brewer's yeasts, during fermentation. In a preferred embodiment of the invention, the source of carbohydrate used is malted grain, raw grain or a mixture thereof.

Malted grain preferably consists of grains and seeds of barley, wheat, rye, oats, millet, triticale, rice, sorghum and/or sweet corn which have been subjected to a malt production process. Raw grain preferably consists of grains and seeds of barley, wheat, rye, oats, millet, sorghum, triticale, rice and/or sweet corn, which, although having been milled, have not been malted.

Preferably, the starting materials are saccharified before fermentation. For this purpose, the malt-inherent, hydrolytically active enzymes such as amylases, maltases etc., which convert starch into non-attenuable dextrins and attenuable glucose, maltose and maltotriose, are used. During malt preparation, the steeped cereals are allowed to germinate preferably at 12° C. to 18° C. and the germination process is interrupted as soon as the enzyme formation and dissolution processes have reached the desired degree. This takes place preferably by using elevated temperatures with a high throughput of air. By predrying at preferably 40 to 50° C. (withering), the water content can be reduced from more than 50% to 10 to 12%. Subsequently, the temperature can preferably be raised to approximately 80 to 85° C. in order to adjust the water content of the malt to preferably approximately 4 to 5%. This process is referred to as kilning.

Preferably, a single or several of the microorganisms selected from a bottom-fermenting *Saccharomyces cerevisiae* strain, a top-fermenting *Saccharomyces cerevisiae* strain, *Saccharomyces carlsbergensis*, *Saccharomyces diastaticus* and *Schizosaccharomyces pombe*, is/are used for fermentation.

Using the process according to the invention, microbiologically stabilised top-fermented or bottom-fermented beer is preferably produced. Bottom-fermented beer is obtained in the case of bottom fermentation where the yeast settles on the bottom of the vessel after fermentation and can be separated off from there. Top-fermented beer is a beer which is obtained by top fermentation, the yeast rising upwards at the end of fermentation and being separated off at the top as far as possible.

In a further preferred embodiment of the invention, it is provided for the fermentation process to be carried out using at least one yeast and at least one acidogen selected from the group consisting of representatives of *Lactobacillus* sp., *Acetobacter* sp. and *Gluconobacter* sp. In a preferred aspect of this embodiment it is, for example, provided for the fermentation to be carried out using *S. cerevisiae* and/or *S. diastaticus* and/or *Schizosaccharomyces pombe* and a representative of *Lactobacillus*. Lactobacilli which are also known as lactic acid bacteria are capable of fermenting lactic acid. Beers or beer-like beverages produced as a result of such fermentation are characterised by a mild acidic taste which corresponds approximately to that of Berliner Weiβe beer.

In a further preferred aspect of this embodiment, it is provided, for example, for the fermentation to be carried out using *S. cerevisiae* and/or *S. diastaticus* and/or *Schizosaccharomyces pombe* and a representative of *Acetobacter*. The species of *Acetobacter* comprises, in the narrower sense of the word, the acetic acid bacteria which are capable of forming acetic acid by the oxidation of ethanol. The beers or beer-like beverages thus produced are given an acidic taste which is markedly different from the taste of the beverages obtained using *Lactobacillus*.

In a further preferred aspect of this embodiment, it is provided, for example, for the fermentation to be carried out using *S. cerevisiae* and/or *S. diastaticus* and/or *Schizosaccharomyces pombe* and a representative of *Gluconobacter*. *Gluconobacter* is capable, on the one hand, of oxidising ethanol to acetic acid and, on the other hand, glucose to gluconic acid. The beers or beer-like beverages produced by this mixed fermentation also have a pleasant acidic taste.

Preferably, the isomaltulose is added to the wort as carbohydrate component in the form of a syrup, solution or as a crystalline solid before the main fermentation process, particularly preferably during the preparation of the wort. In a variation, isomaltulose is added before and during mashing, preferably together with at least one further carbohydrate component such as malt and/or unmalted grain. In a different variation, isomaltulose is added at or shortly before the end of mashing. In a further variation, isomaltulose is added to the clarified wort only after separating off the spent grains.

By using isomaltulose during the production of beer, a beer is obtained which, even while being a green beer, is particularly poor in taste-impairing secondary fermentation products. The subject matter of the invention consequently consists also of a beer or mixed beer beverage producible by the process according to the invention. A subject matter is also a dietetic beer, malted drink, "Malzbier" or beer-like soft drink.

"Malted drink" should be understood to be a slightly hopped, carbon dioxide-containing and dark beverage with a predominantly malt-aromatic taste of malt sweetness which, moreover, is low in alcohol to free from alcohol. Preferably, the malted drink is brewed with approximately 7-8% original wort from the malt content. After filtering, it is adjusted preferably with sweetening sugars (glucose, sucrose) to 12% of original wort (approximately one third of the original wort).

The mixed beer beverage according to the invention contains at least the beer producible by means of the process according to the invention and at least one further component selected from extract of herbs, aroma compounds, caffeine, colorants, amino acids, culinary acids, fruit components such as fruit juice, fruit pulp or fruit extracts, sugar, sugar substitutes such as sugar alcohols such as intensive sweeteners, water, distilled spirits (ethanol) and basic lemonade constituents.

"Herb components" should be understood to mean in particular: extracts, solutions, essences from parts of plants, preferably anise, valerian root, stinging nettle, blackberry leaves, strawberry leaves, fennel, lady's mantle, goose grass, ginseng, rosehip, hibiscus flowers, raspberry leaves, elderberry, hops, ginger, St.-John's wort, camomile, coriander, curled mint, lapacho plant, lavender, lemon grass, marjoram, mallow, balm, mistletoe, peppermint, marigold, rosemary, gentian, milfoil, thyme, hyssop, cinnamon etc. "Fruit components" should be understood to mean in particular: fruit extracts, preferably from apples, bananas, pears, pineapple, oranges, grapefruit, cherry, sour cherry, limes, lemons, passion fruit, peaches, sea buckthorn, raspberries, strawberries, blackberries, redcurrants, gooseberries, kiwi fruit etc.

Preferably, it is provided for the mixed beer beverage to contain natural or nature-identical odour-bearing substances and/or flavourings as aroma components such as essential oils from plants or fruit such as citrus oil, peppermint oil or clove oil, fruit essences, aroma-conferring fruit juices, anise, menthol, eucalyptus etc.

The colorant components are preferably colorants of plant origin such as carotinoids, flavonoids or anthocyans, colorants of animal origin, inorganic pigments such as iron oxide pigments, products from enzymatic and non-enzymatic browning, products formed by heating such as caramel, sugar colour or synthetic colorants such as azo compounds, triphenylmethane compounds, indigoid compounds, xanthene compounds or quinoline compounds. Suitable synthetic colorants are for example erythrosine, indigo carmine or tartrazine which are used for colour correction and/or for producing a pleasing appearance of the mixed beer beverage according to the invention.

The amino acid components are preferably mixtures of essential amino acids. Preferred amino acids are his, lie, leu, lys, thr, trp, val and taurin.

The acid components are preferably culinary acids. In a preferred embodiment, the beverages according to the invention are available as carbonated drinks, in other words, they may contain carbonic acid/carbon dioxide.

In a particularly preferred embodiment, the mixed beer beverages according to the invention also contain caffeine components such as extracts, preparations or essences from coffee beans, tea plant or parts thereof, Brazil tea plant or parts thereof, cola nut, cocoa bean or guarana.

According to the invention, it is thus possible to influence the diacetyl content of the green beer by using certain quantities of isomaltulose in the wort. In the quantity provided according to the invention, the isomaltulose content does not influence the taste of beer. According to the invention, isomaltulose can be used for adjusting the residual content of diacetyl at the end point of the main fermentation process, the duration of the main fermentation process remaining unchanged. The brewmaster can thus control the brewing result with respect to the formation of these secondary fermentation products while the practical execution of the process remains unchanged, on the one hand to keep the total diacetyl content as low as possible but also in order to produce new taste aspects in the beer. This is particularly advantageous for providing novel mixed beer beverages.

A subject matter of the present invention consequently consists also of the use of isomaltulose for controlling the proportion of secondary fermentation products, in particular vicinal diketones, diacetyl (2,3-butanedione), pentanedione, in the beer, wherein isomaltulose is used as a carbohydrate component in the wort for the production of the beer. Isomaltulose is added to the wort in the proportion provided for according to the invention.

A further subject matter is finally also the use of isomaltulose for shortening the fermentation period during the production of the beer, wherein isomaltulose is used as a carbohydrate component in the wort for producing the beer. In this case, the fermentation period during the main fermentation process is shortened by terminating the main fermentation as soon as the attenuable portion of the extract of the wort has been attenuated. Isomaltulose is added to the wort in the proportion provided for according to the invention.

The subject matter of the invention is explained in further detail by way of the following practical examples and the corresponding Figures, while these should not be understood to be limiting.

EXAMPLES

Example 1

Figure 1:
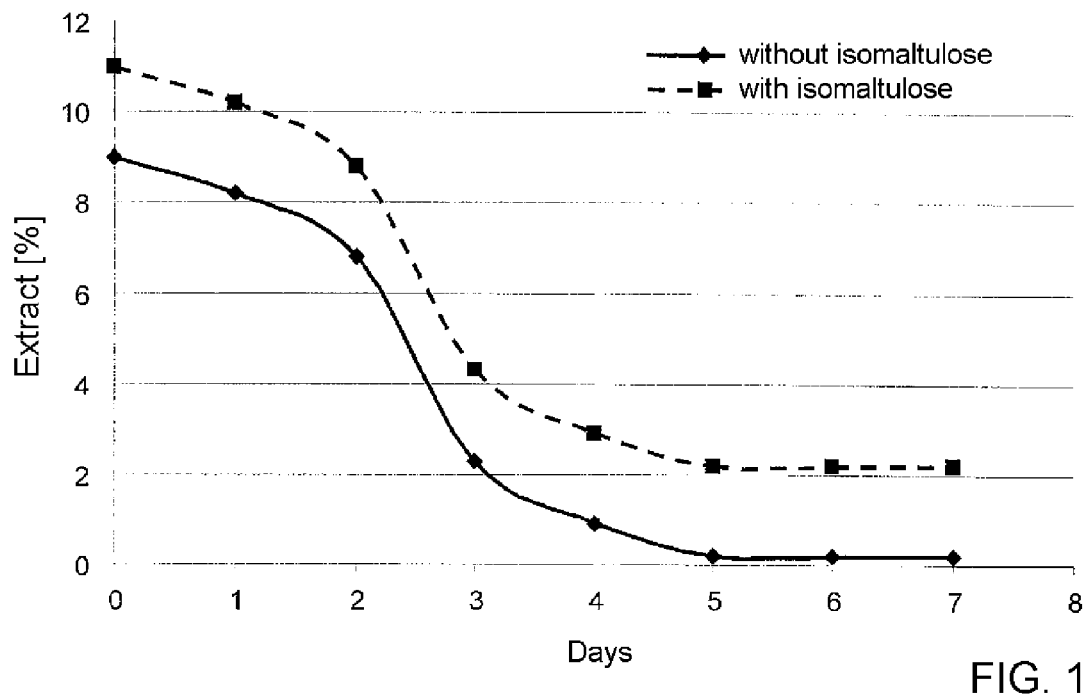
FIG. 1: Typical extract development during main fermentation for a known wort (comparative wort) made from 50 g of malt/400 ml without isomaltulose (proportion of extract approximately 9%), and isomaltulose-containing wort (according to the invention) made from 50 g of malt/400 ml and 3 g of isomaltulose (proportion of extract: approximately 11%); after approximately 5 days, the end point of fermentation of the fermentable extract is reached; the extract content does not decrease any further.

Fermentation of Isomaltulose-Containing Worts on a Laboratory Scale 1.1 Trial Batches Worts were produced according to the congress method (MEBAK). Each batch is based on a volume of 400 ml. To produce congress wort, malt (malt A) was finely milled (milling gap: 0.2 mm) and an amount of 50 g was weighed in. In order to be able to assess the influence of the malt used, a further comparative batch was produced with a different malt (in the following: malt B). Three different mashing batches were produced in each case:

"Zero sample": 50 g of malt in 400 ml water

"3 g of Palatinose": 50 g of malt+3 g of isomaltulose in 400 ml of water

"6 g of Palatinose": 50 g of malt+6 g of isomaltulose in 400 ml of water

First, 250 ml of tepid doubly distilled water were introduced into each beaker and mashing was carried out by stirring at 100 rpm for 30 minutes at 45° C. Subsequently the temperature was ramped up to 70° C. at 1° C./min and 100 ml of tepid doubly distilled water were added. This temperature was maintained for 60 min. After mashing, the content of the beaker was increased to exactly 450 g with doubly distilled water (corresponding to 50 g of malt+400 ml of water).

Subsequently, the worts were filtered with a pleated filter into a measuring cylinder after having been homogenised with a glass rod. The filtered worts obtained were transferred into bottles equipped with clip closures and autoclaved for 16 min. at 121° C. The sterile worts were stored in the cold (at approximately 4° C.) until further use.

After separating off the spent grains by filtration, approximately 380 ml or wort with the following average extract contents are obtained per batch:
"Zero sample": 9.2%
"3 g of Palatinose": 9.8%
"6 g of Palatinose": 10.5%
1.2 Pitching 5 different yeasts (three bottom-fermenting, two top-fermenting) were used to attenuate the worts produced with malt A; these should be considered to be "normal" brewer's yeasts.
S. carlsbergensis MJJ11
S. carlsbergensis MJJ10
S. carlsbergensis MJJ42
S. cerevisiae MJJ15
S. cerevisiae MJJ18

3 ml of the yeast culture suspension (approximately 30 to 40 million cells/ml) were added to each wort.

The wort batches produced with malt B were attenuated according to the same pattern using S. carlsbergensis MJJ11.
1.3 Main Fermentation In the case of all the batches, the main fermentation took place for 7 days in open vessels at 26° C. with the exclusion of light. In the course of fermentation, samples were taken in order to determine the development of the extract. For this purpose, the samples were subjected to renewed filtration before measuring the extract in order to remove turbid matter which may have formed. The determination of the diacetyl content in the samples was carried out according to the photometric method of MEBAK. The extract and alcohol measurement was carried out with the Alcolyzer® device (Anton Paar GmbH).
1.4 Results Table 1 shows the diacetyl quantities formed after fermentation of the worts produced from malt A [ppm]

TABLE 1

| yeast | zero sample | 3 g of Palatinose | 6 g of Palatinose |
|---|---|---|---|
| MJJ 10 | 0.09 | 0.04 | 0.09 |
| MJJ 11 | 0.09 | 0.07 | 0.07 |
| MJJ 42 | 0.07 | 0.05 | 0.08 |
| MJJ 15 | 0.13 | 0.1 | 0.14 |
| MJJ 18 | 0.05 | 0.03 | 0.05 |

Table 2 shows the diacetyl quantities formed after fermentation of the wort produced from malt B [ppm]

TABLE 2

| yeast | zero sample | 3 g of Palatinose | 6 g of Palatinose |
|---|---|---|---|
| MJJ 11 Malt B | 0.19 | 0.12 | 0.14 |

Table 3 shows the average values of the diacetyl quantities formed at the end point of extract fermentation (all batches) [ppm]

TABLE 3

| zero sample | 3 g of Palatinose | 6 g of Palatinose |
|---|---|---|
| 0.10 | 0.07 | 0.10 |

On addition of 3 g of isomaltulose to the wort, the diacetyl quantities formed are substantially below those of the zero samples. This is true without exception for all the batches considered. On average, a decrease of 30% is achieved.

The addition of 6 g of isomaltulose to the wort causes no uniform reduction in the diacetyl quantities. On average, the same diacetyl content is obtained on adding 6 g of isomaltulose as in the zero samples.

The effect described appears to be independent of the malt used since a markedly reduced diacetyl content was measured also when using malt B in the presence of 3 g of isomaltulose, when using 6 g of isomaltulose again only a slightly reduced value was measured.

In the same way, the effect is independent of whether bottom or top-fermenting yeasts are used, the effects observed occurred in the case of all the yeasts considered.

During the fermentation of worts on a laboratory scale, it was thus found that, in the batches with an addition of a small amount of isomaltulose (3 g/400 ml) considered, markedly less diacetyl was formed than in the comparative batches not containing isomaltulose. This effect was determined in the case of all the yeasts examined (three bottom-fermenting, two top-fermenting) and does not depend on the malt used.

Example 2

Fermentation of Isomaltulose-Containing Worts on a Pilot Plant Scale

In a brewery on pilot plant scale, two different beers were produced:
"Dietetic beer": beer in the case of which, ideally, only isomaltulose is present as carbohydrate in the finished product.
"Beer with a reduced alcohol content": beer in the case of which part of the original wort has been substituted by isomaltulose such that less alcohol is formed during conventional fermentation and process control.

The beers were attenuated at approximately 12° C. in open fermenting tubs and subsequently processed further correspondingly. Fermentation was considered as having been completed when the extract content did not decrease further over the fermentation period (end point of extract fermentation). The analysis of the diacetyl quantities formed was carried out according to the photometric method of MEBAK. The carbohydrate contents of the worts corresponded to those according to Example 1.
2.2 Results Table 4 shows the analytical values of the worts produced in each case, with and without isomaltulose.

TABLE 4

| wort | | beer, with reduced alcohol content | beer, with reduced alcohol content + isomaltulose | dietetic beer | dietetic beer + isomaltulose |
|---|---|---|---|---|---|
| extract content | wt. % | 7.15 | 11.48 | 7.47 | 11.55 |
| extract, apparent, final fermentation reached | wt. % | 1.65 | 5.10 | 0.30 | 4.10 |
| final fermentation, apparent | % | 77.40 | 56.70 | 96.1 | 65.60 |
| pH | | 6.00 | 5.70 | 5.86 | 5.76 |
| depth of colour | EBC | 4.60 | 5.20 | 5.70 | 5.90 |

TABLE 4-continued

| wort | | beer, with reduced alcohol content | beer, with reduced alcohol content + isomaltulose | dietetic beer | dietetic beer + isomaltulose |
|---|---|---|---|---|---|
| bitterness units | BE | 45.30 | 44.90 | 31.20 | 33.00 |
| free amino nitrogen | ppm | 114 | 115 | 126 | 122 |
| diacetyl content at the end point of extract fermentation | ppm | 0.36 | 0.13 | 0.13 | 0.10 |

It is possible to clearly recognise the difference in the extract contents caused by the addition of isomaltulose, before and after final fermentation. Apart from that, the analytical values remain unchanged within the limits of accuracy of measurement. This does not apply to the pH. As in the case of previous series of experiments, this is reduced slightly by the addition of isomaltulose. As a result of the low proportion of barley malt, the values for free amino nitrogen are fairly low in all worts.

It has been found that both the maximum value of the quantity of diacetyl formed as well as the quantity of diacetyl on the last day of fermentation was in some cases considerably higher in the isomaltulose-free comparative wort than in the wort to which isomaltulose had been added.

Figure 2:
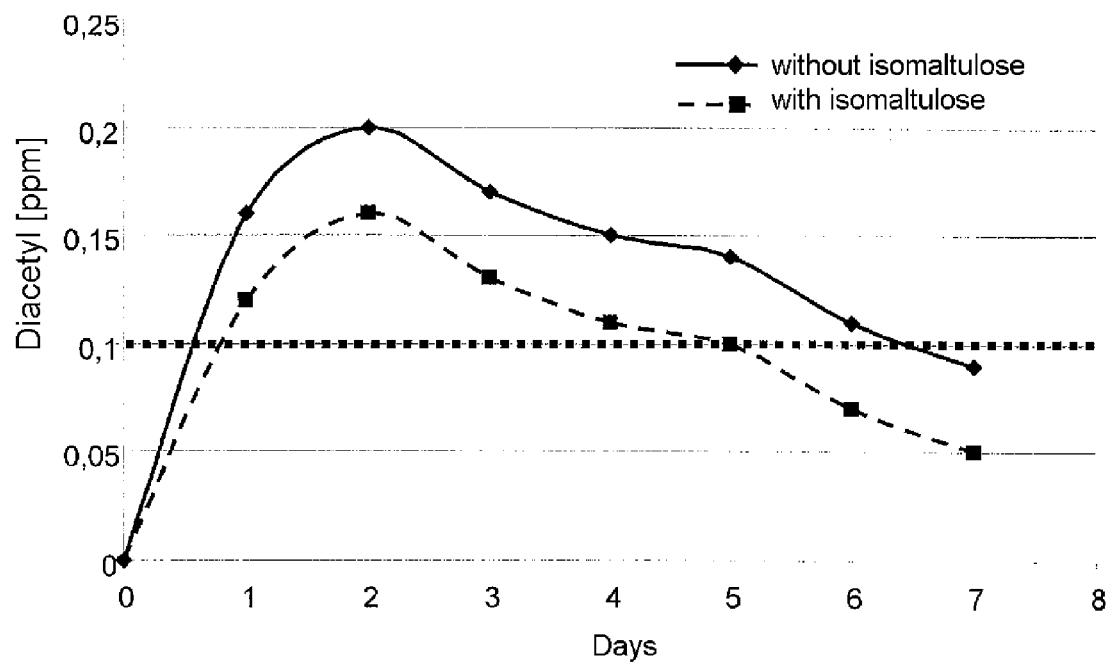
FIG. 2: Typical development of the diacetyl content during main fermentation using the worts according to FIG. 1; in the case of the isomaltulose-containing wort (according to the invention), the value for diacetyl falls below the taste threshold value as early as at the time of final fermentation of the extract (day 5): the green beer is available for secondary fermentation/maturation earlier; in the case of conventional wort (comparative wort), the value falls below the taste threshold value only after approximately 7 days; main fermentation is prolonged by approximately 2 days.

FIGS. 1 and 2 show the typical development of fermentation during the main fermentation process of beer production. As expected, the isomaltulose-containing batch exhibits a higher extract content. In the case of both, isomaltulose-containing wort and wort without isomaltulose, the extract content reaches a stable value on day 5; this means that fermentation of the attenuable extract is completed at that point (end point of extract fermentation). FIG. 2 shows that, when using the isomaltulose-containing wort, the taste has fallen below the taste threshold value of 0.1 ppm as early as at the end point of extract fermentation. The green beer obtained is available for further processing at this early point in time. In the case of the comparative batch without isomaltulose, the main fermentation needs to be continued for a period of 1 to 2 days in order for the flavour to fall below the taste threshold value. Consequently, further processing of the green beer is delayed. Simultaneously, the main fermentation tub is blocked for use for a new fermentation batch for this period.

Example 3

Influence of Isomaltulose on the Aroma Profile of Fermented Real Worts

In order to be able to assess the influence of isomaltulose on the aroma of beers, isomaltulose was added to the wort as carbohydrate component in a proportion considerably above the proportion anticipated according to the invention.

3.1 Real Worts

A conventional Pilsner wort was produced. Part of this wort was treated in such a way that approximately one quarter of the extract consisted of isomaltulose. The untreated original wort and the isomaltulose-containing wort were attenuated under the same conditions (without pressure, 12° C.) with the same yeasts as those used for the model worts.

The worts were treated up to approximately 1 to 1.5% above the extract to be expected on fermentation, then followed a 14 day secondary fermentation at 1° C. The beers thus produced were analysed in a beer-specific manner according to MEBAK and by-chromatography for the same selected aroma components as the model worts. In addition, a taste assessment was carried out. The change in the analytically determined aroma profile and the taste impression were to be determined as a function of the isomaltulose content.

The wort analyses are given in Table 5.

TABLE 5

Wort analyses with and without isomaltulose

| parameter | | wort | wort + 25% isomaltulose |
|---|---|---|---|
| extract content | % | 11.26 | 11.33 |
| extract, apparent, final fermentation reached | % | 1.93 | 4.2 |
| final fermentation, apparent | % | 83.3 | 62.6 |
| pH | | 5.36 | 5.2 |
| colour depth | EBC | 8.6 | 6.4 |
| bitterness units | BE | 48.1 | 31.6 |
| total nitrogen | ppm | 969 | 655 |
| free amino nitrogen | ppm | 175 | 124 |
| zinc | ppm | 0.17 | 0.15 |
| DMS/dimethyl disulphide | ppm | 30 | 20 |

The worts were adjusted to a very similar extract content. The addition of isomaltulose caused a decrease in final fermentation since the proportion of non-fermentable carbohydrate (in the analysis of final fermentation) increases as a result of the substitution of wort-inherent extract by isomaltulose. The further analytical values change in line with redilution, i.e. the content, such as bitter substances or protein fractions, decreases.

Both worts were fermented with the following four yeasts:
Saccharomyces carlsbergensis MJJ 11,
Saccharomyces cerevisiae MJJ 25,
Saccharomyces cerevisiae MJJ 2,
Schizosaccharomyces pombe 3.2 Analysis of the Aroma Components The following aroma components were determined in all the batches on termination of fermentation (=4 days no decrease in extract):
Acetaldehyde, ethyl acetate, 1-propanol, isobutanol, isoamyl acetate, 2-methyl butanol, 3-methyl butanol, 2-phenyl ethanol, phenyl acetate.
Apart from the relevant aroma components, the vicinal diketones formed during fermentation were also determined.

3.3 Results 3.3.1 Analysis

Table 6 shows the analytical values of the worts attenuated with Saccharomyces carlsbergensis MJJ 11 and Saccharomyces cerevisiae MJJ 25 (with and without isomaltulose).

Table 7 shows the analytical values of the worts attenuated with Schizosaccharomyces pombe and Saccharomyces cerevisiae MJJ 2 (with and without isomaltulose).

TABLE 6

| | MJJ 11 | MJJ 11 with isomaltulose | MJJ 25 | MJJ 25 with isomaltulose |
|---|---|---|---|---|
| original wort, calculated [%] | 11.25 | 11.24 | 11.32 | 11.28 |
| extract, apparent [%] | 2.35 | 3.68 | 3.3 | 4.16 |
| extract, real [%] | 4.04 | 5.1 | 4.82 | 5.44 |
| alcohol [% by vol.] | 4.71 | 3.98 | 4.28 | 3.59 |

TABLE 6-continued

|  | MJJ 11 | MJJ 11 with isomaltulose | MJJ 25 | MJJ 25 with isomaltulose |
|---|---|---|---|---|
| pH | 4.4 | 4.25 | 4.67 | 4.4 |
| bitterness units [BE] | 30 | 27 | 33 | 29 |
| head retention [s] | 276 | 263 | 343 | 281 |

TABLE 7

|  | S. pombe | S. pombe with isomaltulose | MJJ 2 | MJJ 2 with isomaltulose |
|---|---|---|---|---|
| original wort calculated [%] | 11.27 | 11.32 | 11.28 | 11.56 |
| extract apparent [%] | 2.41 | 4.21 | 2.13 | 4.58 |
| extract, real [%] | 4.08 | 5.5 | 3.87 | 5.91 |
| alcohol [% by vol.] | 4.67 | 3.64 | 4.86 | 3.75 |
| pH | 4.38 | 4.36 | 4.45 | 4.36 |
| bitterness units [BE] | 33 | 26 | 29 | 25 |
| head retention [s] | 276 | 197 | 228 | 256 |

The higher residual extract after fermentation is to be seen in the case of beers to which the high proportion of isomaltulose has been added, since the isomaltulose has not been attenuated. This leads also to a lower alcohol content in all cases. This also applies to *Schizosaccharomyces pombe* which was capable of making use of the isomaltulose-containing solutions in the model worts in a similarly satisfactory manner as the reference solution. In more complex mixed carbohydrate solutions, it is obvious that this yeast also makes use of all other sugars first. Before it was possible to completely degrade the isomaltulose in the high concentrations added, fermentation has been completed in this series of experiments. The pH of the isomaltulose-containing beers is lower in all cases than that of the reference beers; the same applies also to the bitterness units though, in this case, the lower value is due to the redilution.

Figure 3A:
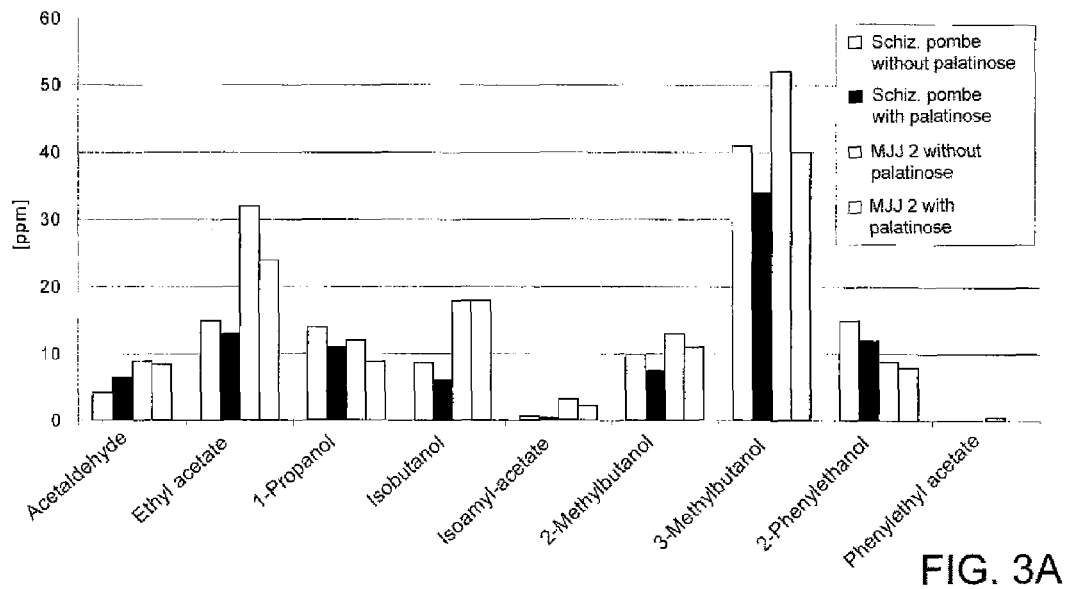
FIG. 3: Proportion of aroma components after fermentation of real worts

FIG. 3a shows the content of aroma components after fermentation of the real worts by *Saccharomyces carlsbergensis* MJJ 11 and *Saccharomyces cerevisiae* MJJ 25. No consistent influence of the addition of isomaltulose on the formation of the aroma component can be detected. Although MJJ 11 forms larger quantities of the substance concerned in the case of almost all the components in the batch without isomaltulose, the differences are only slight and, moreover, they are presumably due to the, in absolute terms, slightly lower quantity of substrate utilised. Moreover, it can be pointed out that, in some cases, *Saccharomyces cerevisiae* MJJ 25 formed higher concentrations of the substance concerned in the isomaltulose-containing solution. It cannot be said unequivocally on the basis of the data shown here that the presence of isomaltulose influences the aroma profile formed.

Figure 3B:
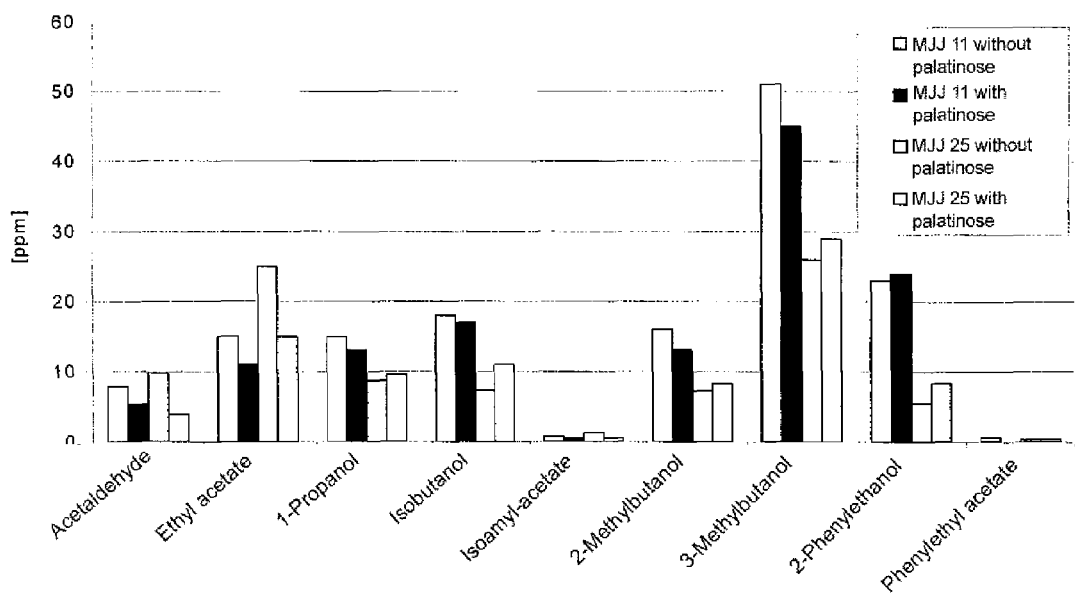

FIG. 3b shows the content of aroma components after fermentation of the real wort by *Schizosaccharomyces pombe* and *Saccharomyces cerevisiae* MJJ 2. Again, no consistent influence of the addition of isomaltulose on the formation on the aroma components is discernible. Although, in most cases, less of the substances under consideration is formed in the worts with the addition of isomaltulose, this is due also to the smaller amount of substrate utilised overall. Remarkably *Schizosaccharomyces pombe* forms again somewhat more acetaldehyde in the presence of isomaltulose.

The presence of isomaltulose does not have any influence worth noting on the development of substances from the group of esters and higher aliphatic alcohols (and acetaldehyde). An exception is here the yeast *Schizosaccharomyces pombe* which obviously forms more acetaldehyde if a larger proportion of isomaltulose is present in the substrate.

3.3.2 Tasting

On completion of the main and secondary fermentation, the beers were subjected to a taste evaluation. On a scale of 1 to 5, each of the following parameters were assessed: impression of sweetness, impression of bitterness, hop aroma, maltiness, fruitiness, liveliness, body and overall impression.

Figure 4A:
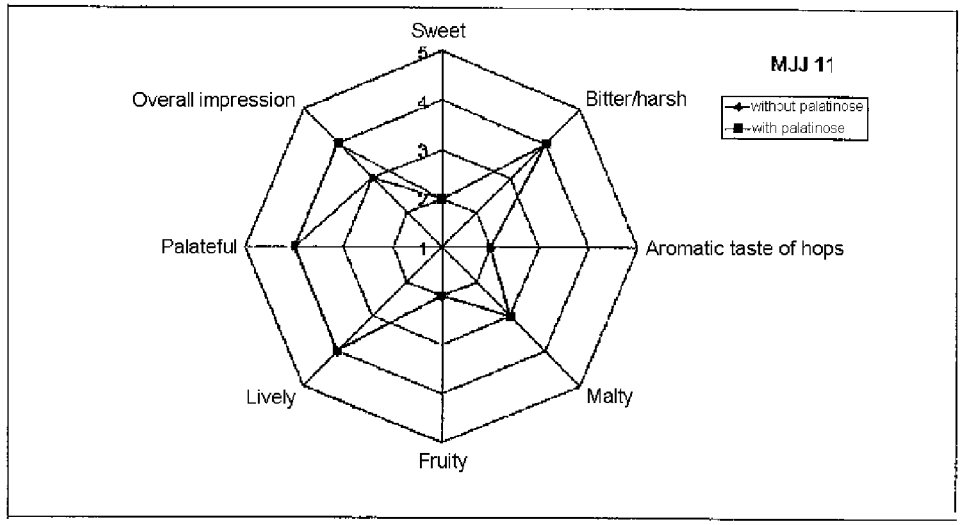
FIG. 4: Taste assessment of beers from real worts.

FIG. 4a shows the results of the taste assessment of the beers made from the real worts, attenuated with *Saccharomyces carlsbergensis* MJJ 11 (10 members of the taste panel): the aroma profiles resulting from the tasting scheme are almost identically superimposed after fermentation by *Saccharomyces carlsbergensis* MJJ 11, irrespective of whether isomaltulose was contained in the wort or not. Only with respect to the overall impression was the isomaltulose beer assessed as being better. A frequently mentioned reason was a "more rounded" taste impression although the individual parameters were assessed identically.

Figure 4B:
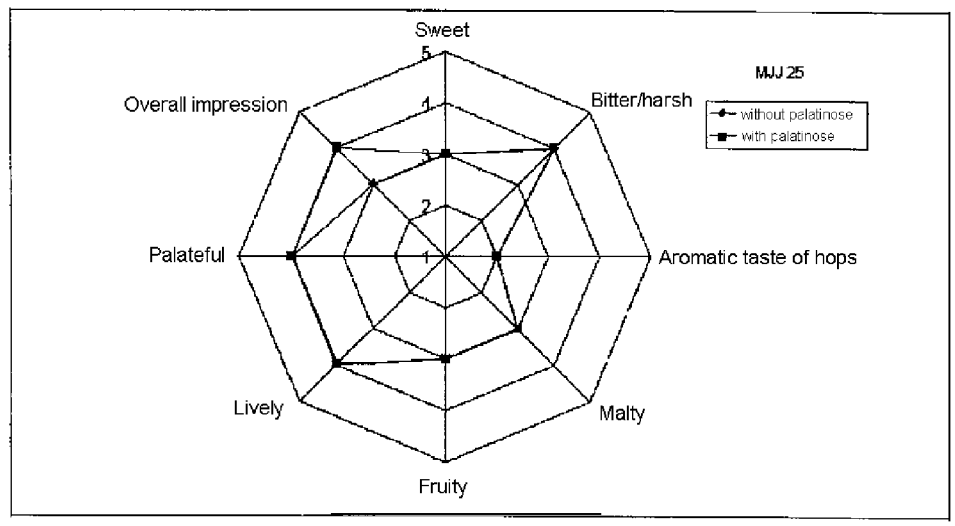

FIG. 4b shows the results of the taste assessment of the beers made from the real worts; attenuated with *Saccharomyces cerevisiae* MJJ 25 (10 members of the taste panel): After fermentation with *Saccharomyces cerevisiae* MJJ 25, too, the aroma profiles are superimposed in an almost identical manner. Again, the isomaltulose-containing beer was assessed as being slightly better in the overall assessment although the individual parameters were assessed identically. After fermentation with *Saccharomyces cerevisiae* MJJ 25, however, both the bitterness impression and the fruitiness of the beers was perceived more strongly.

Figure 4C:
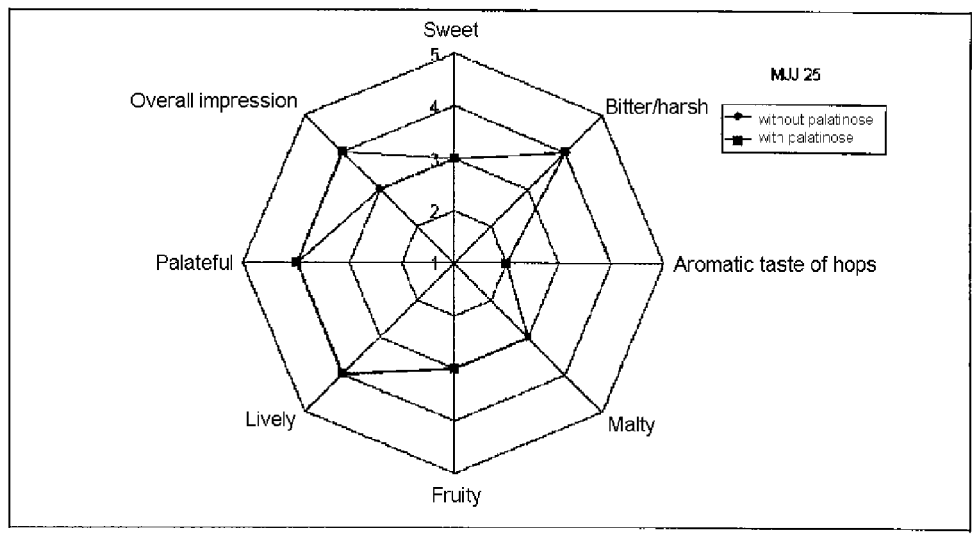

FIG. 4c shows the results of the taste assessment of the beers made from the real worts; attenuated with *Saccharomyces cerevisiae* MJJ 2 (10 members of the taste panel): Following fermentation with *Saccharomyces cerevisiae* MJJ 2, the beers were again assessed fairly similarly. The beer without isomaltulose was perceived as less sweet, instead the impression of bitterness became more dominant though, on the other hand, it was obviously somewhat compensated by the presence of isomaltulose. Both beers were assessed identically for overall quality.

Figure 4D:
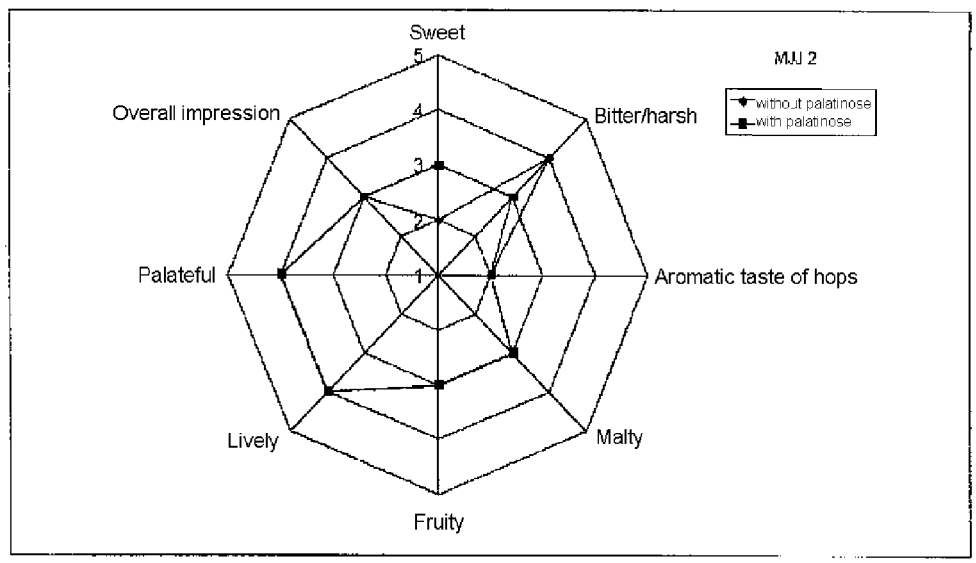

FIG. 4d shows the results of the taste assessment of the beers made from the real worts; attenuated with *Schizosaccharomyces pombe* (10 members of the taste panel): Following fermentation by *Schizosaccharomyces pombe*, the beers clearly differed substantially. The isomaltulose-containing beer was perceived as sweeter, though obviously this sweetness was perceived as being malty. Although the intensity of bitterness was perceived equally strongly, this bitterness was perceived as slightly more hop-aromatic in the case of beers without isomaltulose, an impression which was obviously compensated by the isomaltulose contained therein. However, when assessing the overall quality, the isomaltulose-containing beer was assessed as being slightly better.

The isomaltulose-containing beers were perceived in the majority of cases not as substantially different from the reference beers. Regarding the overall quality, the addition may cause the impression of the beer to appear somewhat "rounder" by compensating for negative influences on the taste such as e.g. stronger bitterness.

What is claimed is:

1. A process for the production of beer comprising providing a wort formed from a combination of brewing liquor, optionally hops, and a carbohydrate component wherein the carbohydrate component contains isomaltulose or an isomaltulose-containing mixture and wherein the amount of isomaltulose contained in said wort is 0.75 g/100 ml wort, and wherein main fermentation is terminated and secondary fermentation is started as soon as an end point of extract attenuation is reached, wherein the end point is recognized by the extract portion not decreasing any further during the further course of fermentation, and wherein, due to the presence of said isomaltulose in the wort in an amount of 0.75 g/100 ml wort, the proportion of vicinal diketones is lower compared to an identical wort that does not contain said isomaltulose.

2. Process according to claim 1, wherein the carbohydrate component contains at least one of malted grain and raw grain.

3. Process according to claim 1, wherein isomaltulose is contained in the carbohydrate component of the wort in a proportion of the remaining components of the carbohydrate component to isomaltulose of from 20:1 to 8:1.

4. Process according to claim 1, wherein the isomaltulose of the carbohydrate component is added as a syrup, in solution or as a crystalline solid.

5. The process according to claim 1, wherein secondary fermentation products are present in said beer and wherein said secondary fermentation products are selected from the group consisting of vicinal diketones, diacetyl (2,3-butanedione) and pentane dione.

6. The process according to claim 1, wherein fermentation is shortened during main fermentation by the main fermentation being terminated as soon as an attenuable portion of an extract of the wort has been attenuated.

* * * * *